US006897591B2

(12) United States Patent
Peachee et al.

(10) Patent No.: US 6,897,591 B2
(45) Date of Patent: May 24, 2005

(54) SENSORLESS SWITCHED RELUCTANCE ELECTRIC MACHINE WITH SEGMENTED STATOR

(75) Inventors: C. Theodore Peachee, St. Louis, MO (US); Donald J. Williams, Pierron, IL (US); James A. Wafer, Belleville, IL (US); Marielle Piron, Harrogate (GB); Steven P. Randall, Leeds (GB); Richard S. Wallace, Jr., Ferguson, MO (US); Michael L. McClelland, Leeds (GB)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 09/817,559

(22) Filed: Mar. 26, 2001

(65) Prior Publication Data

US 2002/0135254 A1 Sep. 26, 2002

(51) Int. Cl.⁷ .................. H02K 17/00; H02K 11/00; H02K 1/12; H02K 13/00; H02P 1/46
(52) U.S. Cl. ............... 310/166; 310/254; 310/68 B; 318/254; 318/439; 318/701; 318/720
(58) Field of Search ................. 310/166, 258, 310/259, 68 B, 254, 214, 218; 318/138, 254, 439, 701, 720–724

(56) References Cited

U.S. PATENT DOCUMENTS

| | | |
|---|---|---|
| 1,756,672 A | 4/1930 | Barr |
| 2,688,103 A | 8/1954 | Sheldon |
| 2,894,157 A | 7/1959 | Morrill ............. 310/79 |
| 3,604,222 A | 9/1971 | Sandkrug et al. |
| 3,914,859 A | 10/1975 | Pierson ............. 29/596 |
| 3,979,821 A | 9/1976 | Noodleman |
| 3,987,324 A | 10/1976 | Linkous |
| 4,130,770 A | 12/1978 | Wrobel |
| 4,149,309 A | 4/1979 | Mitsui |
| 4,340,829 A | 7/1982 | McCoy |

(Continued)

FOREIGN PATENT DOCUMENTS

| | | | |
|---|---|---|---|
| DE | 2937838 A1 | * | 7/1980 |
| EP | 0350429 | | 1/1990 |

(Continued)

OTHER PUBLICATIONS

Anthony J. Champagne, "Correlation of Electric Power Steering Vibration to Subjective Ratings", Mar. 6–9, 2000, SAE Technical Paper Series 200–01–0176, p. 1–3.

(Continued)

*Primary Examiner*—Tran Nguyen
*Assistant Examiner*—Julio Gonzalez
(74) *Attorney, Agent, or Firm*—Harness, Dickey & Pierce, P.L.C.

(57) ABSTRACT

A sensorless switched reluctance machine includes a stator with a plurality of circumferentially-spaced stator segment assemblies that include salient stator poles and inter-polar stator slots. Each of the stator segment assemblies includes a stack of stator plates forming a stator segment core, an end cap assembly, and winding wire wound around the stator segment core and the end cap assembly. The rotor defines a plurality of rotor poles. The rotor tends to rotate relative to the stator to a rotational position that maximizes the inductance of an energized winding. A sensorless drive circuit derives rotor position and energizes the winding wire around the stator segment assemblies based on the derived rotor position. Each stator plate includes a first radially outer rim section and a tooth section that extends radially inwardly from a first center portion of the first radially outer rim section.

27 Claims, 7 Drawing Sheets

U.S. PATENT DOCUMENTS

| | | | | |
|---|---|---|---|---|
| 4,350,914 A | | 9/1982 | Searle | 310/194 |
| 4,418,307 A | * | 11/1983 | Hoffmann et al. | 318/721 |
| 4,584,495 A | | 4/1986 | Kordik | |
| 4,635,349 A | | 1/1987 | Rabe | 29/596 |
| 4,698,542 A | | 10/1987 | Muller | |
| 4,772,839 A | | 9/1988 | MacMinn et al. | |
| 4,812,695 A | | 3/1989 | Parshall | 310/258 |
| 4,819,460 A | | 4/1989 | Obradovic | |
| 4,845,837 A | | 7/1989 | Lloyd | |
| 4,883,982 A | | 11/1989 | Forbes et al. | |
| 4,896,089 A | | 1/1990 | Kliman et al. | |
| 4,922,165 A | | 5/1990 | Crawford et al. | |
| 4,950,932 A | | 8/1990 | Harms et al. | |
| 4,953,284 A | | 9/1990 | Hammer et al. | |
| 4,959,596 A | | 9/1990 | MacMinn et al. | |
| 4,998,052 A | | 3/1991 | Erdman et al. | |
| 5,034,642 A | | 7/1991 | Hoemann et al. | |
| 5,076,076 A | | 12/1991 | Payne | |
| 5,161,393 A | | 11/1992 | Payne et al. | |
| 5,173,650 A | | 12/1992 | Hedlund et al. | |
| 5,194,775 A | | 3/1993 | Cooper | |
| 5,212,419 A | | 5/1993 | Fisher et al. | |
| 5,252,902 A | * | 10/1993 | Uehara et al. | 318/599 |
| 5,256,926 A | | 10/1993 | Hagenlocher et al. | |
| 5,257,828 A | | 11/1993 | Miller et al. | |
| 5,301,523 A | | 4/1994 | Payne et al. | |
| 5,325,677 A | | 7/1994 | Payne et al. | |
| 5,327,053 A | * | 7/1994 | Mann et al. | 318/254 |
| 5,410,235 A | * | 4/1995 | Ehsani | 318/701 |
| 5,457,375 A | | 10/1995 | Marcinkiewicz et al. | |
| 5,467,025 A | | 11/1995 | Ray | |
| 5,491,859 A | | 2/1996 | Richardson | |
| 5,563,463 A | | 10/1996 | Stark | |
| 5,578,880 A | | 11/1996 | Lyons et al. | |
| 5,583,387 A | * | 12/1996 | Takeuchi et al. | 174/DIG. 20 |
| 5,589,751 A | | 12/1996 | Lim | |
| 5,672,925 A | * | 9/1997 | Lipo et al. | 310/154.11 |
| 5,691,591 A | | 11/1997 | McCann | 310/198 |
| 5,701,064 A | | 12/1997 | Horst et al. | |
| 5,720,065 A | | 2/1998 | Myers et al. | |
| 5,729,072 A | | 3/1998 | Hirano et al. | |
| 5,740,880 A | | 4/1998 | Miller | |
| 5,743,721 A | | 4/1998 | Graham et al. | |
| 5,763,978 A | | 6/1998 | Uchida et al. | |
| 5,777,416 A | | 7/1998 | Kolomeitsev | |
| 5,783,916 A | * | 7/1998 | Blackburn | 318/254 |
| 5,786,651 A | | 7/1998 | Suzuki | |
| 5,793,179 A | | 8/1998 | Watkins | |
| 5,806,169 A | | 9/1998 | Trago et al. | |
| 5,811,905 A | * | 9/1998 | Tang | 310/162 |
| 5,821,661 A | | 10/1998 | Wissmach et al. | |
| 5,859,518 A | | 1/1999 | Vitinic | |
| 5,877,568 A | | 3/1999 | Maes et al. | |
| 5,883,485 A | | 3/1999 | Mehlhorn | |
| 5,923,141 A | | 7/1999 | McHugh | |
| 5,929,590 A | | 7/1999 | Tang | |
| 5,949,211 A | * | 9/1999 | McCann | 318/701 |
| 5,955,861 A | | 9/1999 | Jeong et al. | |
| 5,979,195 A | | 11/1999 | Bestell et al. | |
| 5,982,117 A | | 11/1999 | Taylor et al. | |
| 5,990,592 A | | 11/1999 | Miura et al. | |
| 5,994,804 A | | 11/1999 | Grennan et al. | |
| 5,996,379 A | | 12/1999 | Skrippek | |
| 6,011,368 A | | 1/2000 | Kalpathi et al. | |
| 6,020,661 A | * | 2/2000 | Trago et al. | 310/43 |
| 6,040,647 A | | 3/2000 | Brown et al. | |
| 6,041,625 A | | 3/2000 | Nagai et al. | 68/12.02 |
| 6,049,153 A | | 4/2000 | Nishiyama et al. | |
| 6,066,905 A | | 5/2000 | Wright et al. | 310/179 |
| 6,081,083 A | | 6/2000 | Nashiki | |
| 6,087,755 A | | 7/2000 | Suzuki et al. | 310/254 |
| 6,092,619 A | | 7/2000 | Nishikawa et al. | |
| 6,102,151 A | | 8/2000 | Shimizu et al. | |
| 6,104,113 A | * | 8/2000 | Beifus | 310/68 B |
| 6,107,772 A | | 8/2000 | Liu et al. | |
| 6,122,579 A | | 9/2000 | Collier-Hallman et al. | |
| 6,127,753 A | | 10/2000 | Yamazaki et al. | |
| 6,144,131 A | | 11/2000 | Hollenbeck et al. | |
| 6,166,468 A | | 12/2000 | Suzuki et al. | 310/90 |
| 6,177,751 B1 | | 1/2001 | Suzuki et al. | 310/269 |
| 6,188,196 B1 | * | 2/2001 | Koide et al. | 318/700 |
| 6,194,805 B1 | | 2/2001 | Heese et al. | |
| 6,194,806 B1 | * | 2/2001 | Suzuki et al. | 310/216 |
| 6,204,579 B1 | | 3/2001 | Arpino | |
| 6,211,587 B1 | | 4/2001 | Enomoto et al. | 310/52 |
| 6,218,753 B1 | | 4/2001 | Asano et al. | |
| 6,219,900 B1 | * | 4/2001 | Suzuki | 100/291 |
| 6,226,856 B1 | | 5/2001 | Kazama et al. | |
| 6,239,530 B1 | | 5/2001 | Garcia | 310/216 |
| 6,252,325 B1 | * | 6/2001 | Nashiki | 310/168 |
| 6,266,591 B1 | | 7/2001 | Wilson-Jones et al. | |
| 6,300,700 B1 | | 10/2001 | Nishiyama et al. | |
| 6,329,782 B1 | | 12/2001 | Chen et al. | |
| 6,359,412 B1 | * | 3/2002 | Heglund | 318/701 |
| 6,369,481 B1 | | 4/2002 | Bahn | |
| 6,369,687 B1 | * | 4/2002 | Akita et al. | 310/216 |
| 6,373,211 B1 | | 4/2002 | Henry et al. | |
| 6,384,564 B1 | * | 5/2002 | Pollock | 318/701 |
| 6,389,678 B1 | | 5/2002 | Ackermann et al. | 29/596 |
| 6,411,006 B2 | | 6/2002 | Suzuki et al. | 310/254 |
| 6,487,769 B2 | | 12/2002 | Ketterer et al. | 29/596 |
| 2001/0010452 A1 | * | 8/2001 | Moriarty | 318/700 |
| 2001/0030517 A1 | * | 10/2001 | Batzel | 318/254 |
| 2002/0089251 A1 | | 7/2002 | Tajima et al. | |

FOREIGN PATENT DOCUMENTS

| | | |
|---|---|---|
| EP | 0823711 A1 | 2/1998 |
| EP | 0778660 A3 | 9/1998 |
| EP | 0868010 A1 | 9/1998 |
| EP | 0871282 A1 | 10/1998 |
| EP | 0967135 A2 | 12/1999 |
| FR | 2719324 | 11/1995 |
| GB | 1200279 | 7/1970 |
| JP | 61030938 | 2/1986 |
| JP | 404049826 A | 2/1992 |
| JP | 05-038086 | 2/1993 |
| JP | 08-033292 | 2/1996 |
| JP | 09084282 | 3/1997 |
| JP | 09-233742 | 9/1997 |
| JP | 09-322439 | 12/1997 |
| JP | 10-174319 | 6/1998 |
| JP | 10-210721 | 8/1998 |
| JP | 10-271718 | 10/1998 |
| JP | 11-018331 | 1/1999 |
| JP | 11-089129 | 3/1999 |
| JP | 11-191987 | 7/1999 |
| JP | 11-275830 | 10/1999 |
| JP | 11-289701 | 10/1999 |
| JP | H11-289701 | 10/1999 |
| JP | 11-289726 | 10/1999 |
| JP | 11-289727 | 10/1999 |
| JP | 11-289728 | 10/1999 |
| JP | 411289701 A * | 10/1999 |
| JP | 11-332138 | 11/1999 |
| JP | 11-341717 | 12/1999 |
| JP | 2000-014057 | 1/2000 |
| JP | 2000-37050 | 2/2000 |
| JP | 2000-139052 | 5/2000 |
| JP | 2000-224790 | 8/2000 |
| JP | 2000-312451 | 11/2000 |
| JP | 2000-333388 | 11/2000 |

| | | |
|---|---|---|
| JP | 2001-008395 | 1/2001 |
| WO | WO 00/37731 | 6/2000 |
| WO | WO 00/79670 A1 | 12/2000 |
| WO | WO 01/95459 A1 | 12/2001 |

OTHER PUBLICATIONS

Toboldt/Johnson/Olive, "Goodheart–Willcox Automotive Encyclopedia", 1989, p. 577–584.

Roy McCann, "Variable Effort Steering for Vehicle Stability Enhancement Using an Electric Power Steering System", Mar. 6–9, 2000, SAE Technical Paper Series 2000–01–0817, p. 1–5.

G. Gallegos–Lopez, P.C. Kjaer, T.J.E. Miller, "A New Rotor Position Estimation Method For Switched Reluctance Motors Using PWM Voltage Control", in Proc EPE'97, 7th European Conf. on Power Electronics and Applications Sep. 8–10, 1997 Trondheim Norway vol. 3 pp. 580–585.

Stephenson/Blake, "The Characteristics, Design and Applications of Switched Reluctance Motors and Drives", presented at the PCIM '93 Conference and Exhibition at Nuremburg, Germany, Jun. 21–24, 1993.

T.J.E. Miller, "Switched Reluctance Motors and Their Control", Magna Physics Publishing and Claredon Press Oxford 1993.

WF Ray and IH Al–Bahadly, "Sensorless Methods for Determining the Rotor Position of Switched Reluctance Motors", published in the Proceedings of the European Power Electronics Conference, Brighton UK Sep. 13–16, 1993 vol. 6, pp. 7–13.

Gabriel Gallegos–Lopez, Philip C. Kjaer, T.J.E. Miller; A New Sensorless Method For Switched Reluctance Motor Drives; 1997 IEEE; pp. 564–570.

N.M. Mvungi and J.M. Stephenson; Accurate Sensorless Rotor Position Detection In An SR Motor; EPE FIRENZE 1991.

* cited by examiner

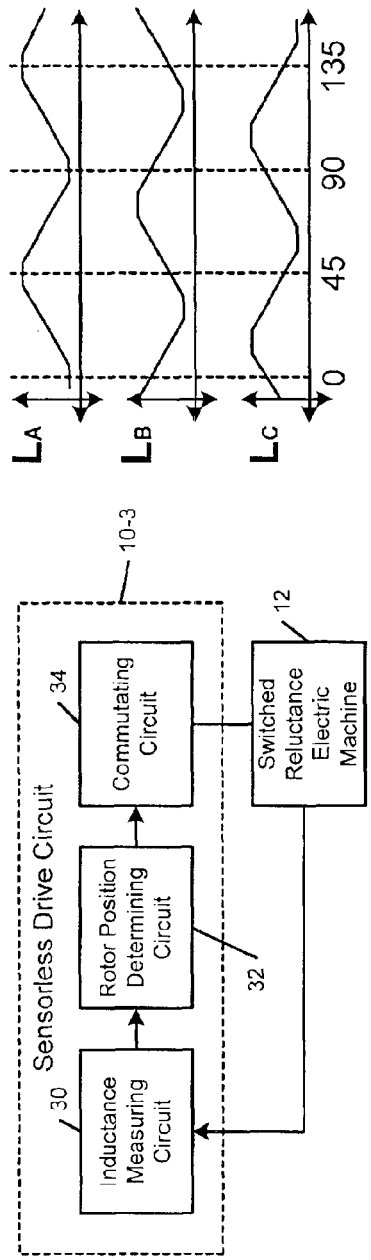
FIG. 4B
FIG. 4A
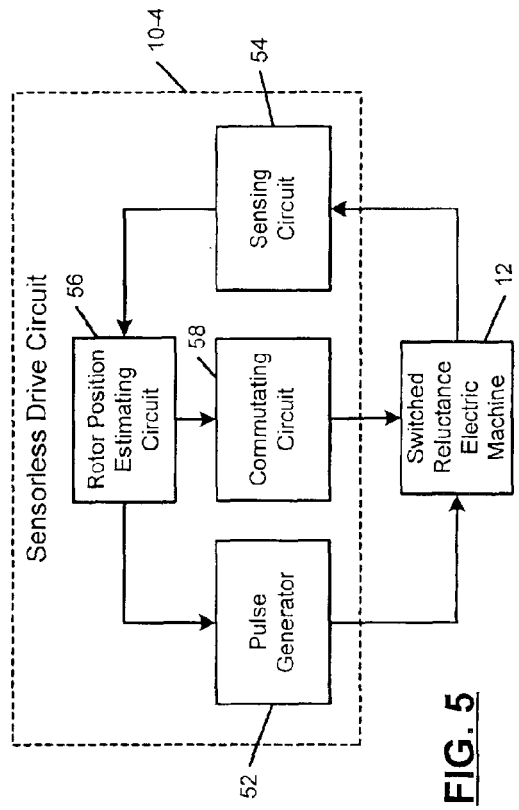
FIG. 5

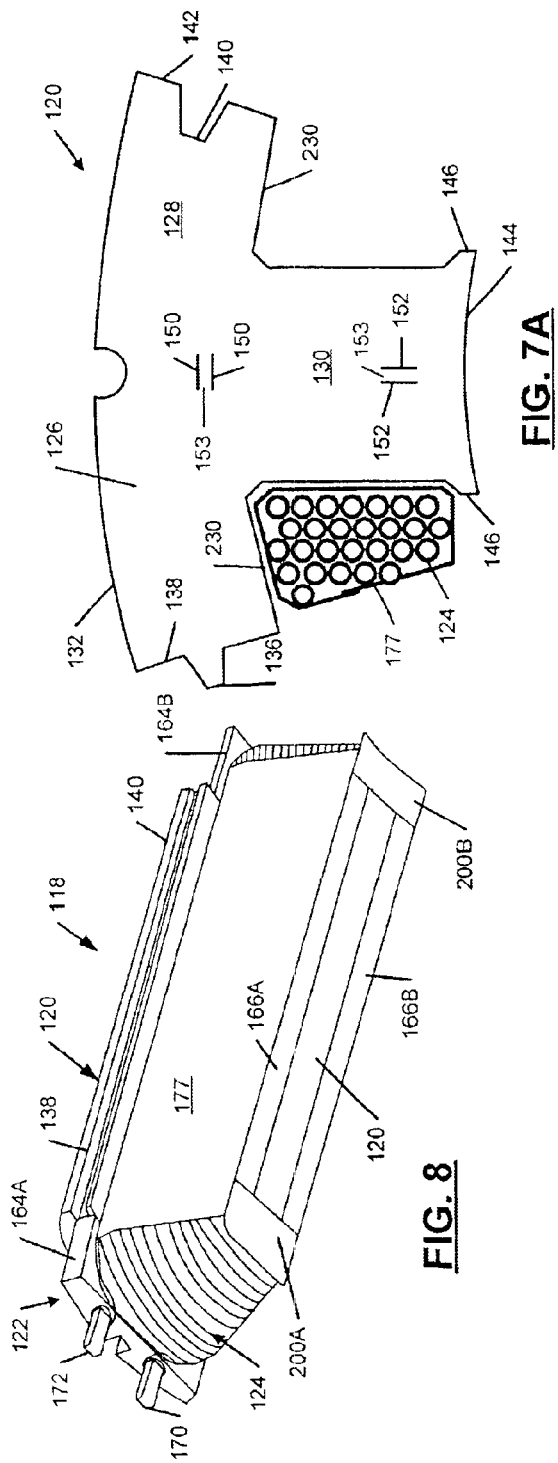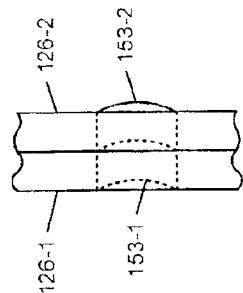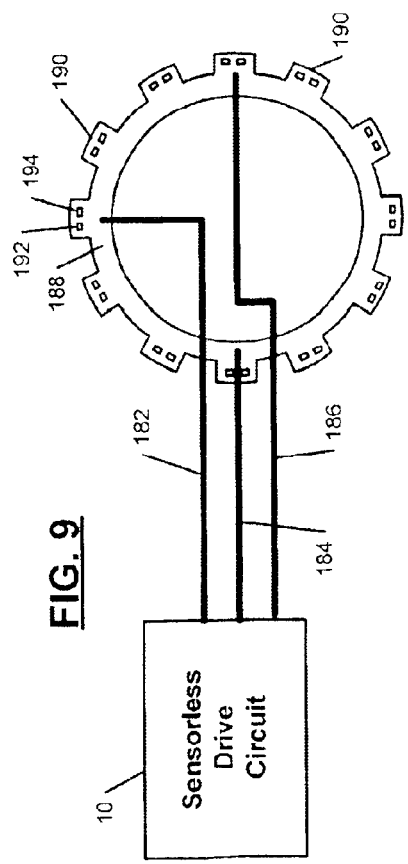

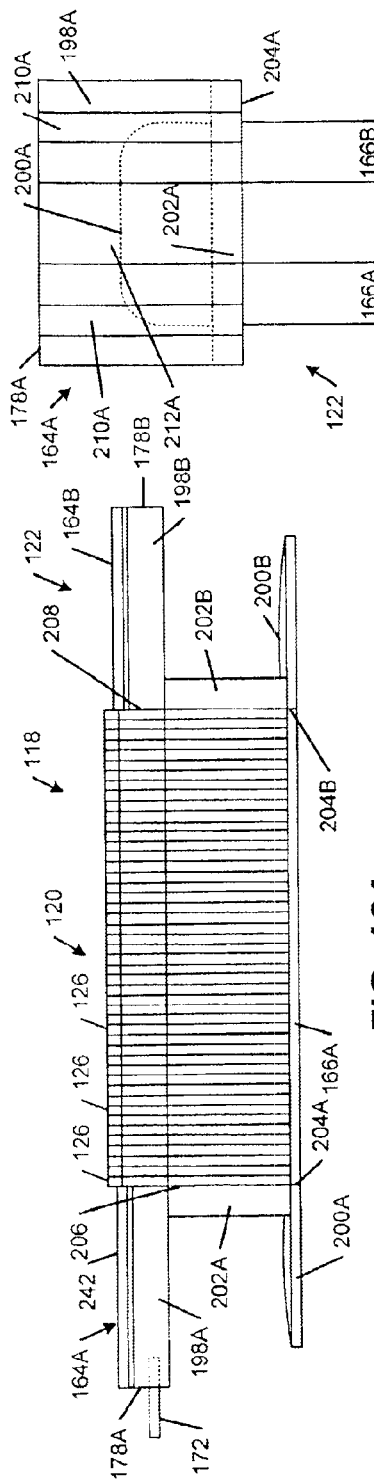
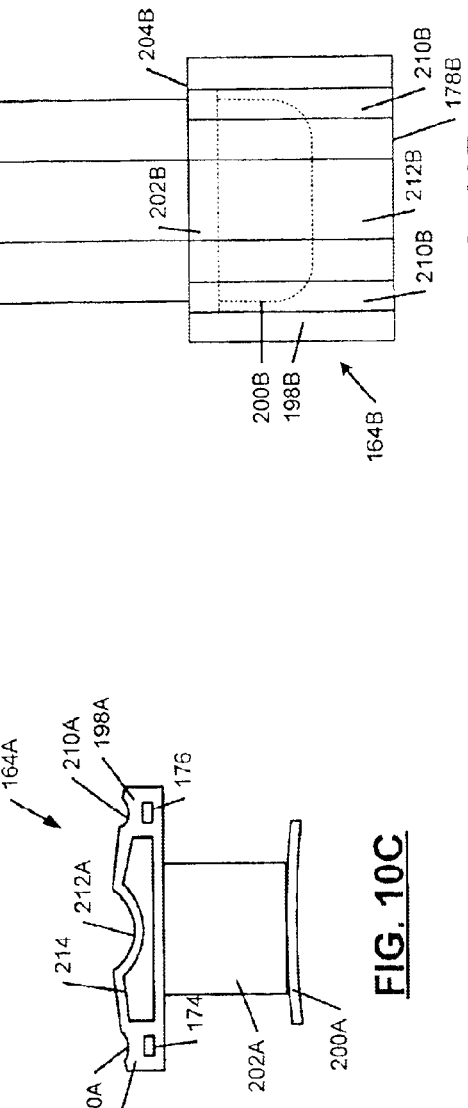

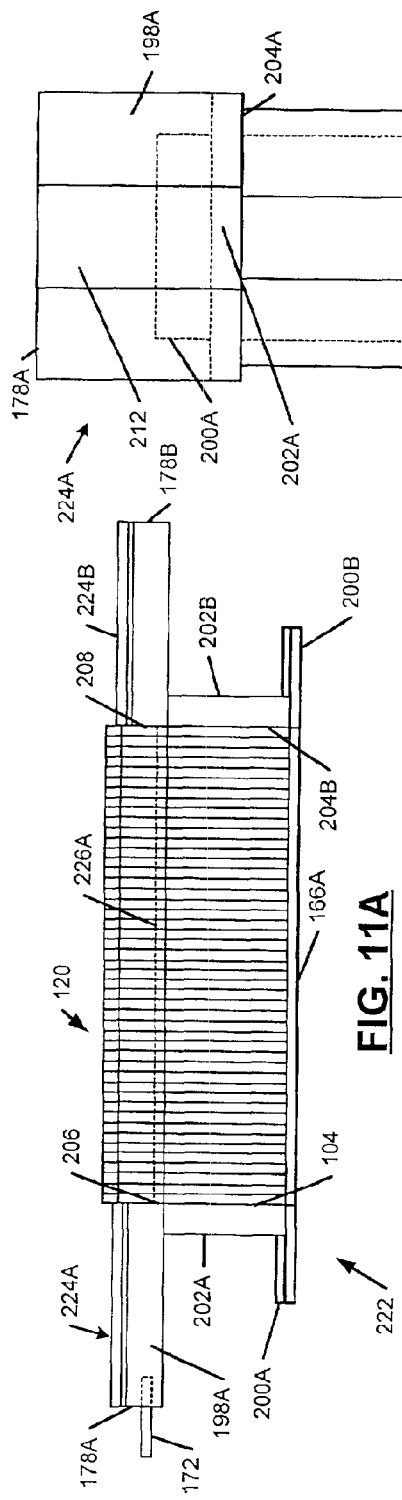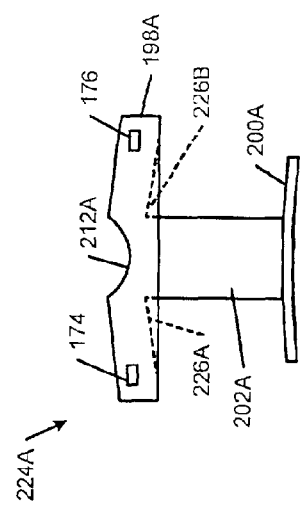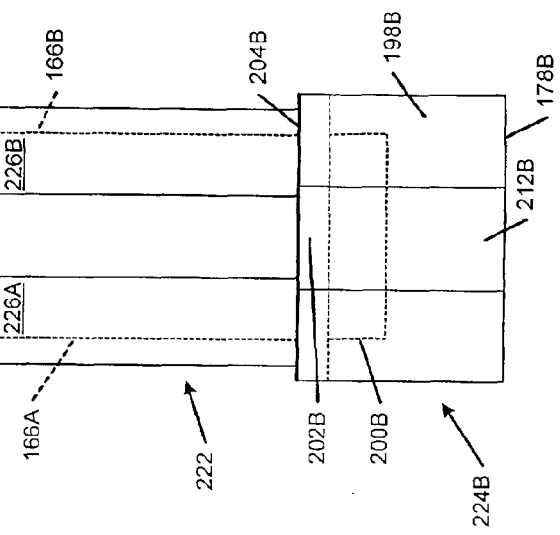
FIG. 11A
FIG. 11B
FIG. 11C

SENSORLESS SWITCHED RELUCTANCE ELECTRIC MACHINE WITH SEGMENTED STATOR

RELATED APPLICATIONS

This application relates to U.S. patent application Ser. Nos. 09/803,876, filed Mar. 12, 2001; Ser. No. 09/754,537, filed Jan. 1, 2001; 09/761,125, filed Jan. 16, 2001; Ser. No. 09/824,980, filed Apr. 3, 2001; Ser. No. 09/817,560, filed Mar. 26, 2001; Ser. No. 09/817,687, filed Mar. 26, 2001; and U.S. Pat. No. 6,487,769, issued Dec. 3, 2002.

FIELD OF THE INVENTION

This invention relates to electric machines and, more particularly to sensorless switched reluctance electric machines including segmented stators.

BACKGROUND OF THE INVENTION

Reluctance electric machines, such as motors and generators, typically include a stator that is mounted inside a machine housing and a rotor that is supported for rotation relative to the stator. Reluctance electric machines produce torque as a result of the rotor tending to rotate to a position that minimizes the reluctance (or maximizes the inductance) of the magnetic circuit. The reluctance is minimized (and the inductance is maximized) when the salient rotor poles are aligned with the energized salient stator poles. A drive circuit generates a set of stator winding currents that are output to the stator pole windings and that create a magnetic field. The rotor rotates in response to the magnetic field. In synchronous reluctance electric machines, the windings are energized at a controlled frequency. In switched reluctance electric machines, the drive circuit and/or transducers detect the angular position of the rotor. The drive circuit energizes the stator windings as a function of the sensed rotor position. The design and operation of switched reluctance electric machines is known in the art and is discussed in T. J. E. Miller, "Switched Reluctance Motors and Their Control", Magna Physics Publishing and Clarendon Press, Oxford, 1993, which is hereby incorporated by reference.

Conventional switched reluctance electric machines generally include a stator with a solid stator core or a laminated stator. The laminated stator includes a plurality of circular stator plates that are punched from a magnetically conducting material. The stator includes pairs of diametrically opposed stator poles that project radially inward. The rotor also includes pairs of diametrically opposed rotor poles. Windings or coils are typically disposed about the stator poles. The windings that are wound around any two diametrically opposed stator poles are connected in series or in parallel to define a machine phase or a phase coil.

By passing current through the phase coil, magnetic fields are established about the stator poles and torque is produced as the energized phase coil attracts a pair of rotor poles into alignment. The current in the phase coils is generated in a predetermined sequence to create the magnetic field that produces continuous rotating torque on the rotor. The period during which current is provided to the phase coil is known as the active stage. At a predetermined point, either as the rotor poles become aligned with the stator poles or at some point prior thereto, the current in the phase coil is commutated to prevent braking torque from acting on the rotor poles. Once the commutation point is reached, the current is switched to another phase coil. During the inactive stage, the current is allowed to dissipate from the phase coil.

In order to maintain torque on the rotor, it is important to maintain the proper relationship between the position of the rotor and the active stage of each machine phase. If the active stage is initiated and/or commutated too early or too late with respect to the position of the rotor, the torque on the rotor will vary and/or the machine will not operate at optimum efficiency.

The drive circuits of conventional switched reluctance electric machines control the current in the phase coils. The drive circuits maintain the proper relationship between the active stage of the machine phases and the position of the rotor by continuously sensing rotor position. There are two distinct approaches for detecting the angular position of the rotor. In a "sensed" approach, an external physical sensor senses the angular position of the rotor. For example, a rotor position transducer (RPT) with a hall effect sensor or an optical sensor physically senses the angular position of the rotor. In a "sensorless" approach, electronics that are associated with the drive circuit derive the angular rotor position without an external physical sensor.

There are many problems that are associated with switched reluctance electric machines that employ the sensed approach. The RPT typically includes a sensor board with one or more sensors and a shutter that is coupled to and rotates with the shaft of the rotor. The shutter includes a plurality of shutter teeth that pass through optical sensors as the rotor rotates. Because the angular rotor position is critical to proper operation, sophisticated alignment techniques are used to ensure that the sensor board of the RPT is properly positioned with respect to the housing and the stator. Misalignment of the sensor board is known to degrade the performance of the electric machine. Unfortunately, utilization of these complex alignment techniques increases the manufacturing costs for switched reluctance electric machines equipped with RPTs.

The RPTs also increase the overall size of the switched reluctance electric machine, which can adversely impact machine and product packaging requirements. The costs of the RPTs often place switched reluctance electric machines at a competitive disadvantage in applications that are suitable for open loop induction motors that do not require RPTs. Another drawback with RPTs involves field servicing of the switched reluctance electric machines. Specifically, wear elements, such as the bearings, that are located within the enclosed rotor housing may need to be repaired or replaced. To reach the wear elements, an end shield must be removed from the housing. Because alignment of the sensor board is critical, replacement of the end shield often requires the use of complex realignment techniques. When the alignment techniques are improperly performed by the service technician, the sensor board is misaligned and the motor's performance is adversely impacted.

Various methods for dispensing with the RPT have been proposed. Several of these are reviewed in "Sensorless Methods for Determining the Rotor Position of Switched Reluctance Motors" by W F Ray and I H Al-Bahadly, published in the Proceedings of The European Power Electronics Conference, Brighton, UK, 13–16 September 1993. Vol. 6, pp 7–13, hereby incorporated by reference. Many of these methods proposed for the rotor position estimation use the measurement of phase flux-linkage (i.e. the integral of applied voltage with respect to time) and current in one or more phases. Position is calculated using knowledge of the variation in inductance of the machine as a function of angle and current. The storage of this data involves the use of a large memory array and/or additional system overheads for interpolation of data between stored points.

In U.S. Pat. No. 5,777,416 to Kolomeitsev, U.S. Pat. No. 6,011,368 to Kalpathi et al, and U.S. Pat. No. 6,107,772 to Liu et al., which are incorporated by reference, a drive circuit measures the rise time of current in a stator winding between two predetermined current levels. The drive circuit calculates the inductance of the phase coil from the current rise time. The drive circuit estimates the angular position of the rotor from the inductance of the phase coil. The drive circuit adjusts the active stage of the phase coil based on the rotor position. U.S. Pat. No. 5,982,117 to Taylor et al. and U.S. Pat. No. 5,883,485 to Mehlhorn, which are incorporated by reference, likewise monitor current in unenergized windings to determine the inductance of the phase coil and the position of the rotor. In U.S. Pat. No. 4,772,839 to MacMinn, which is incorporated by reference, a drive circuit simultaneously measures changes in the current in two unexcited phases. The drive circuit derives rotor position estimates for each phase and combines the rotor position estimates into a combined rotor position estimate.

Some methods make use of this data at low speeds where "chopping" current control is the dominant control strategy for varying the developed torque. These methods usually employ diagnostic energization pulses in non torque-productive phases (i.e. those phases which are not energized directly from the power supply at a particular moment). A method suited to low-speed operation is proposed by N M Mvungi and J M Stephenson in "Accurate Sensorless Rotor Position Detection in a S R Motor", published in Proceedings of the European Power Electronics Conference, Firenze, Italy, 1991, Vol. 1, pp 390–393, which is hereby incorporated by reference.

In U.S. Pat. No. 4,959,596 to MacMinn, et al., which is incorporated by reference, a drive circuit employs a phase inductance sensing technique to indirectly estimate rotor position. Voltage sensing pulses are output to an unexcited phase. The voltage sensing pulses cause a change in phase current that is inversely proportional to the instantaneous phase inductance. Commutation time is determined by comparing the change in phase current to a threshold current. U.S. Pat. No. 5,589,518 to Vitunic which is incorporated by reference, also discloses a drive circuit that employs diagnostic pulses.

Other methods employ the "single-pulse" mode of energization at higher speeds. The current and inductance waveforms, over a phase inductance period, are mirror images of the monitoring waveforms. These methods monitor the operating voltages and currents of an active phase without interfering with normal operation. A typical higher speed method is described in U.S. Pat. No. 5,173,650 to Hedlund, which is hereby incorporated by reference.

Both the chopping and single-pulse modes described above are normally used when the converter applies a fixed value of supply voltage to the phase windings. A further control strategy is the pulse width modulated (PWM) mode, where one or more switches are switched rapidly to effectively produce a supply voltage that is proportional to the duty cycle of the PWM waveform. This allows the use of single-pulse current waveforms at much lower speeds than would be possible on the full supply voltage. The current waveform is made up of a large number of segments, corresponding to the current carried by the switches and diodes respectfully.

Having to store a two-dimensional array of machine data in order to operate without a position sensor is an obvious disadvantage. Alternative methods have been proposed, which avoid the need for the majority of angularly referenced information and instead store data at one angle only. One such method described in U.S. Pat. No. 5,467,025 to Ray which is hereby incorporated by reference. This method senses the phase flux-linkage and current at a predefined angle by adjusting the diagnostic point via the calculated deviation away from a desired point. Two one-dimensional tables are stored in the preferred embodiment, one of flux-linkage versus current at a referenced rotor angle and another of the differential of flux-linkage with respect to rotor angle versus current. By monitoring phase voltage and current, the deviation away from a predicted angle can be assessed, with the aid of the look-up tables, and system operation can be adjusted accordingly. However, such methods, although reducing the amount of information which has to be stored, still have to detect or compute the flux-linkage at a specific rotor angle and may be sensitive to repeatability or manufacturing tolerances in the machine.

A similar approach is disclosed in U.S. Pat. No. 5,793,179 to Watkins, hereby incorporated by reference, where the arrival of the rotor at the peak of the inductance profile is predicted and the system is then put into a freewheeling mode, during which the gradient of the current is measured. While this method works well in the absence of noise, it is not robust enough to disregard false readings produced by noise. Though the current waveform may be relatively immune to induced noise, a drive that uses a PWM voltage supply generates a noisy current waveform. The method disclosed by Watkins '179 also must be used with a converter circuit that is capable of freewheeling.

Other attempts to overcome these deficiencies are described in "A New Rotor Position Estimation Method for Switched Reluctance Motors using PWM Voltage Control", by Gallegos-Lopez, G. Kjaer, P C & Miller, T J E, in Proc EPE'97, 7$^{th}$ European Conf on Power Electronics and Applications, 8–10 Sep. 1997, Trondheim, Norway, Vol. 3, pp 580–585, hereby incorporated by reference. This method continuously samples the current waveform and attempts to detect the change in gradient that is produced by the start of pole overlap and the consequent sudden rise in inductance of the phase. The basic method described by Gallegos-Lopez et al involves detecting the point of pole overlap for monitoring (or pole separation for generating) by detecting the point where the rate of change of the current waveform, with respect to time, is zero. The detector includes a differentiator, a comparator and a single shot multivibrator. The differentiator differentiates the current signal so that at the point of zero di/dt the differentiator output is zero. The comparator detects this zero output and flips state. The system does not require either stored magnetization data or an interval of freewheeling. The system does current feedback and does not work reliably in the presence of noise. Improvements to this system include sampling and storage of over several intervals and interpolation to reduce the effects of false detection caused by noise.

When sensing the angular rotor position using the sensorless approach, variations in the electrical characteristics of the individual stator pole windings can adversely impact the ability of the sensorless drive circuits to correctly derive the angular position of the rotor. Most of the sensorless approaches measure the resistance and/or inductance of the windings. If the resistance and/or inductance varies from one stator winding to another, the sensorless drive circuit may incorrectly derive the angular position of the rotor. This problem is made worse if the windings on the stator poles creep or move over time. When this occurs, the cross section of the stator windings changes, which changes the inductance and resistance of the stator pole winding.

There are several conventional methods for placing the winding wire on the stator of a switched reluctance electric machine. The winding wire can be initially wound and transferred onto the stator poles. Transfer winding tends to leave excess winding wire or loops around axial ends of the stator poles. Transfer winding can typically utilize approximately 60–65% of available stator slot area. Needle winding employs a needle that winds the wire directly on the stator poles. The needle, however, takes up some of the stator slot area, which reduces slot fill to approximately 50%. The positioning of winding wire on the stator poles using these methods varies from one stator pole to the next. Winding creep and other assembly variations also impact the inductance and resistance of the winding wire over time, which makes it difficult to accurately perform "sensorless" control due to the non-conformity of the salient stator poles.

While the design of switched reluctance electric machines is relatively mature, there are several areas requiring improvement. Specifically, it is desirable to improve the uniformity of the electrical characteristics of the stator of switched reluctance electric machines. It is also desirable to eliminate the need for RPTs in switched reluctance electric machines to decrease the cost and to improve both durability and serviceability.

SUMMARY OF THE INVENTION

A sensorless switched reluctance electric machine according to the invention includes a rotor and a segmented stator having a plurality of stator segment assemblies. The stator segment assemblies define salient stator poles and interpolar stator slots. Each of the stator segment assemblies includes a stator segment core and winding wire that is wound around the stator segment core. The rotor defines a plurality of rotor poles. The rotor tends to rotate relative to the stator to a rotational position that maximizes the inductance of an energized winding. A sensorless drive circuit derives rotor position and energizes the winding wire around the stator segment assemblies based on the derived position of the rotor.

According to other features of the invention, the stator segment core includes a plurality of stator plates. Each stator plate has an outer rim section and a tooth-shaped pole section. The stator segment assemblies include an end cap assembly that includes a pair of end caps that are secured to opposite ends of the stator segment core. A pair of retainer plates connect the end caps on opposite sides of the stator segment core. The end cap assembly defines an annular retention channel within which the winding wire is wound. The retention channel facilitates improved precision in the winding process and tends to reduce winding creep during use.

By providing a segmented stator with the end cap assembly in the switched reluctance electric machine, the present invention improves the torque density of the switched reluctance electric machine. As a result, the torque output of the switched reluctance electric machine can be increased and/or the dimensions of the switched reluctance electric machine can be reduced for a given torque output. In addition, the stator segment assemblies can be manufactured with a greater electrical uniformity. The inductance and resistance of the individual stator segments and the stator are also more uniform. Sensorless techniques can be used more effectively when the inductance and resistance characteristics of the stator are more uniform. Sensorless rotor position sensing techniques lower the manufacturing costs of the switched reluctance electric machine when compared to sensed rotor position techniques and improve reliability and serviceability in the field.

Other objects, features and advantages will be apparent from the specification, the claims and the drawings.

BRIEF DESCRIPTION OF THE DRAWINGS

FIG. 4A is a functional block diagram of a third exemplary sensorless drive circuit and the switched reluctance electric machine;

FIG. 4B illustrates the inductance of phase coils of the switched reluctance machine as a function of rotor position;

FIG. 5 is a functional block diagram of a fourth exemplary sensorless drive circuit and the switched reluctance electric machine;

FIG. 7A illustrates a stator plate;

FIG. 7C illustrates central portions that are deformed in a die punch operation and that are used to releasably engage adjacent stator plates;

FIG. 8 is a perspective view of a stator segment assembly associated with the stator;

FIG. 9 illustrates the sensorless drive circuit and a circuit board for connecting the sensorless drive circuit to terminals of the stator segment assemblies;

FIG. 10A shows the stator segment assembly with wire windings and insulation removed to better illustrate a stack of stator plates and the end cap assembly;

FIG. 10B is a plan view of the end cap assembly shown in FIG. 10A;

FIG. 10C is an end view of the end cap assembly shown in FIG. 10B;

FIG. 11A is similar to FIG. 10A except that an alternate end cap assembly is shown;

FIG. 11B shows a plan view of the alternate end cap assembly of FIG. 11A; and

FIG. 11C illustrates an end view of the alternate end cap assembly shown in FIG. 11B.

DETAILED DESCRIPTION OF THE PREFERRED EMBODIMENTS

The following detailed description provides preferred exemplary embodiments only and is not intended to limit the scope, applicability or configuration of the present invention. Rather, the detailed description of the preferred exemplary embodiments will provide those skilled in the art with an enabling description for implementing the preferred exemplary embodiments of the present invention. It will be understood that various changes may be made in the function and arrangement of the elements without departing from the spirit and scope of the invention as set forth in the appended claims.

The stator of the switched reluctance electric machine according to the present invention has highly uniform electrical characteristics. The segmented stator and the end cap assembly according to the invention allow more precise winding of the stator poles and retention of the windings during use. As a result of the more uniform electrical characteristics, sensorless measurement techniques for deriving rotor position can be employed more successfully. The sensorless switched reluctance machine can be manufactured at a lower cost with improved reliability and serviceability.

Figure 1:
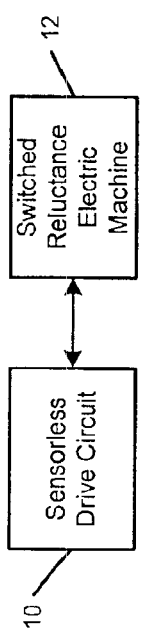
FIG. 1 is a functional block diagram of a sensorless drive circuit and a switched reluctance machine.

Referring now to FIG. 1, a sensorless drive circuit 10 is connected to a switched reluctance electric machine 12. The sensorless drive circuit 10 derives the position of the rotor in a sensorless manner. In other words, the sensorless drive circuit 10 lacks a physical sensor such as the RPT. The sensorless drive circuit 10 includes an application specific integrated circuit (ASIC), a controller, a processor, memory (such as read only memory (ROM), random access memory (RAM), flash memory, etc.), hardwired circuitry, and/or combinations thereof.

Figure 2:
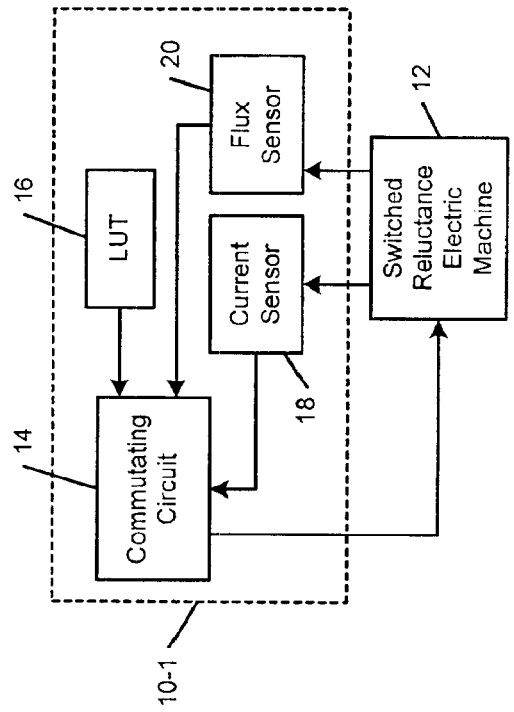
FIG. 2 is a functional block diagram of a first exemplary sensorless drive circuit and the switched reluctance electric machine.

Referring now to FIG. 2, a sensorless drive circuit 10-1 includes a commutating circuit 14, a lookup table 16, a current sensor 18, and a flux sensor 20. The sensorless drive circuit 10-1 senses the phase flux-linkage and current at a predefined angle using the current sensor 18 and the flux sensor 20. Two one-dimensional tables are stored in the lookup table 16. By monitoring phase voltage and current, the deviation away from a predicted angle can be assessed with the aid of the lookup tables and system operation can be adjusted accordingly.

Figure 3B:
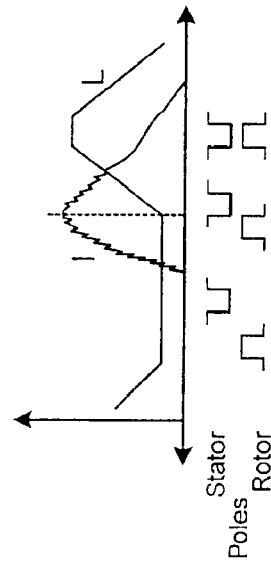
FIG. 3B illustrates current and inductance as a function of rotor and stator pole position.
Figure 3A:
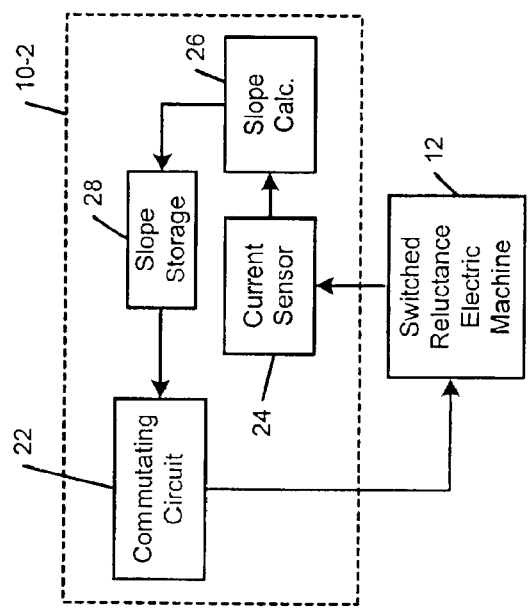
FIG. 3A is a functional block diagram of a second exemplary sensorless drive circuit and the switched reluctance electric machine.

Referring now to FIGS. 3A and 3B, a sensorless drive circuit 10-2 includes a commutating circuit 22, a current sensor 24, a slope calculating circuit 26, and a slope storage circuit 28. As can be seen in FIG. 3B, as the rotor pole approaches the stator pole with an energized stator winding, current increases to a maximum value that occurs when the leading edge of the rotor tooth is aligned with the trailing edge of the stator pole. By monitoring the slope of the current as it transitions from a positive value to zero to a negative value, the position of the rotor pole can be identified.

Referring now to FIG. 4A, a sensorless drive circuit 10-3 includes an inductance measuring circuit 30, a rotor position determining circuit 32, and a commutating circuit 34. As can be seen in FIG. 4B, the inductance of the machine with its phase coils varies from a minimum to a maximum value as a function of angular rotor position. The sensorless drive circuit 10-3 employs this property when deriving the position of the rotor. The inductance of the machine with its phase coils varies in approximately linear fashion between the maximum and minimum inductance values. Using the relationship set forth in FIG. 4B, the sensorless drive circuit 10-3 derives the angular position of the rotor and employs the rotor position to determine the commutation timing of the phase coils.

The inductance measuring circuit 30 measures the inductance of one or more unenergized phase coils. The rotor position determining circuit 32 derives the angular position of the rotor based on the inductance measurement and outputs a rotor position signal to the commuting circuit 34. The commutating circuit 34 calculates the optimum commutation angle to deenergize one or more coils and to energize one or more other phase coils based in part on the derived rotor position signal.

Referring now to FIG. 5, a sensorless drive circuit 10-4 for the sensorless switched reluctance electric machine 12 includes a pulse generator 52, a sensing circuit 54, a rotor position estimating circuit 56, and a commutating circuit 58. The rotor position estimating circuit 56 triggers the pulse generator 52 to output diagnostic pulses to one or more phase coils of the sensorless switched reluctance electric machine 12. The sensing circuit 54 senses changes in the phase current of the phase coil and outputs a phase current change signal to the rotor position estimating circuit 56. The rotor position estimating circuit 56 derives the angular rotor position from the sensed phase current change signal and outputs a rotor position signal to the commutating circuit 58. The commutating circuit 58 determines the optimum angle to de-energize one or more phase coils and to energize one or more other phase coils.

As can be appreciated by skilled artisans, other sensorless drive circuits may be employed. For example, the specific sensorless drive circuits set forth in the U.S. Patents that are identified above may be employed. The switched reluctance electric machine, that is set forth in more detail below, is particularly suitable for sensorless operation due to its uniform electrical characteristics.

Referring now to the remaining drawings, the sensorless switched reluctance machine 12 is shown to include a housing 112, a segmented stator 114 mounted in the housing 112, and a rotor 116 supported for rotation relative to the segmented stator 114. In accordance with the present invention, the segmented stator 114 includes a plurality of stator segment assemblies 118 that can be individually assembled and subsequently combined with additional stator segment assemblies to provide the segmented stator 114. As will be detailed, each stator segment assembly 118 includes a stator segment core 120, an end cap assembly 122, and winding wire 124 that is wound around the stator segment core 120 and the end cap assembly 122. The end cap assembly 122 insulates the ends of the stator segment core 120 and provides retention for additional turns of the winding wire 124.

Figure 6:
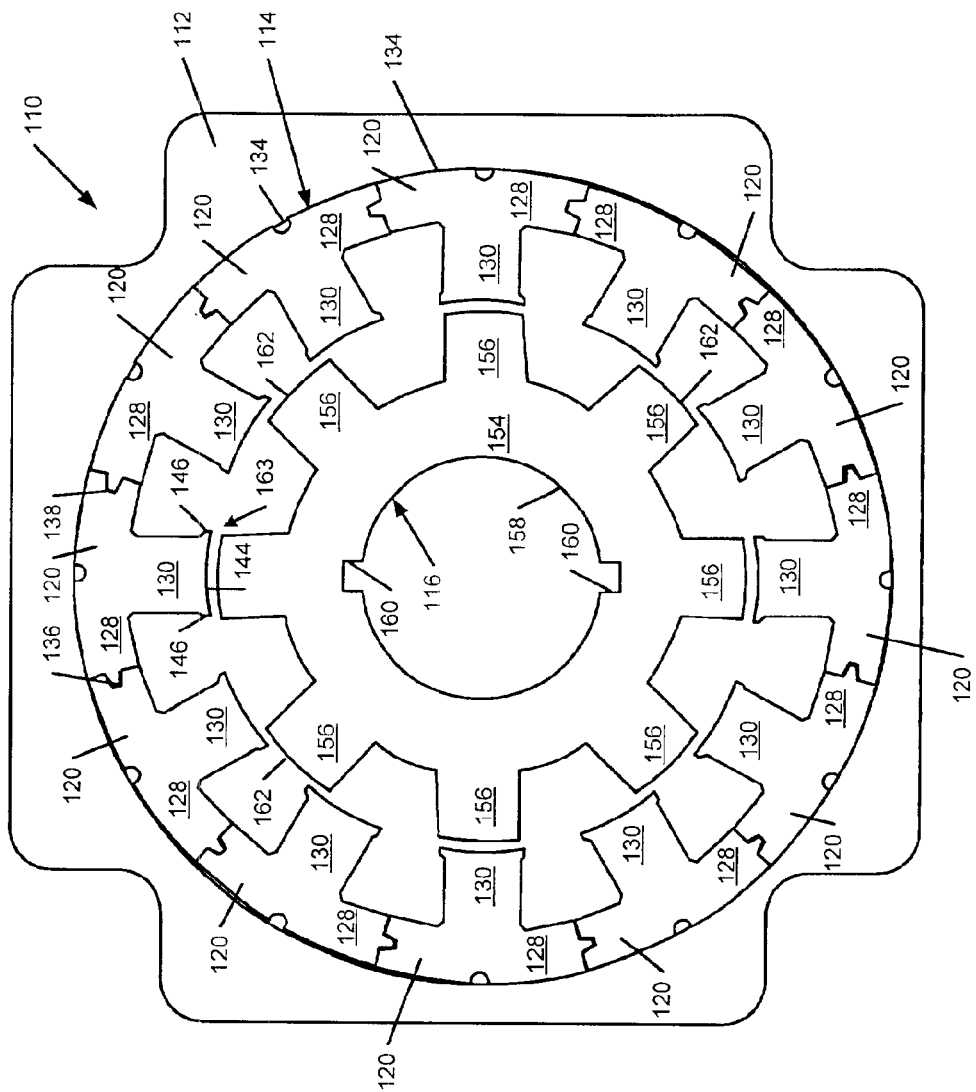
FIG. 6 illustrates a segmented stator and a rotor for the switched reluctance machine.
Figure 7B:
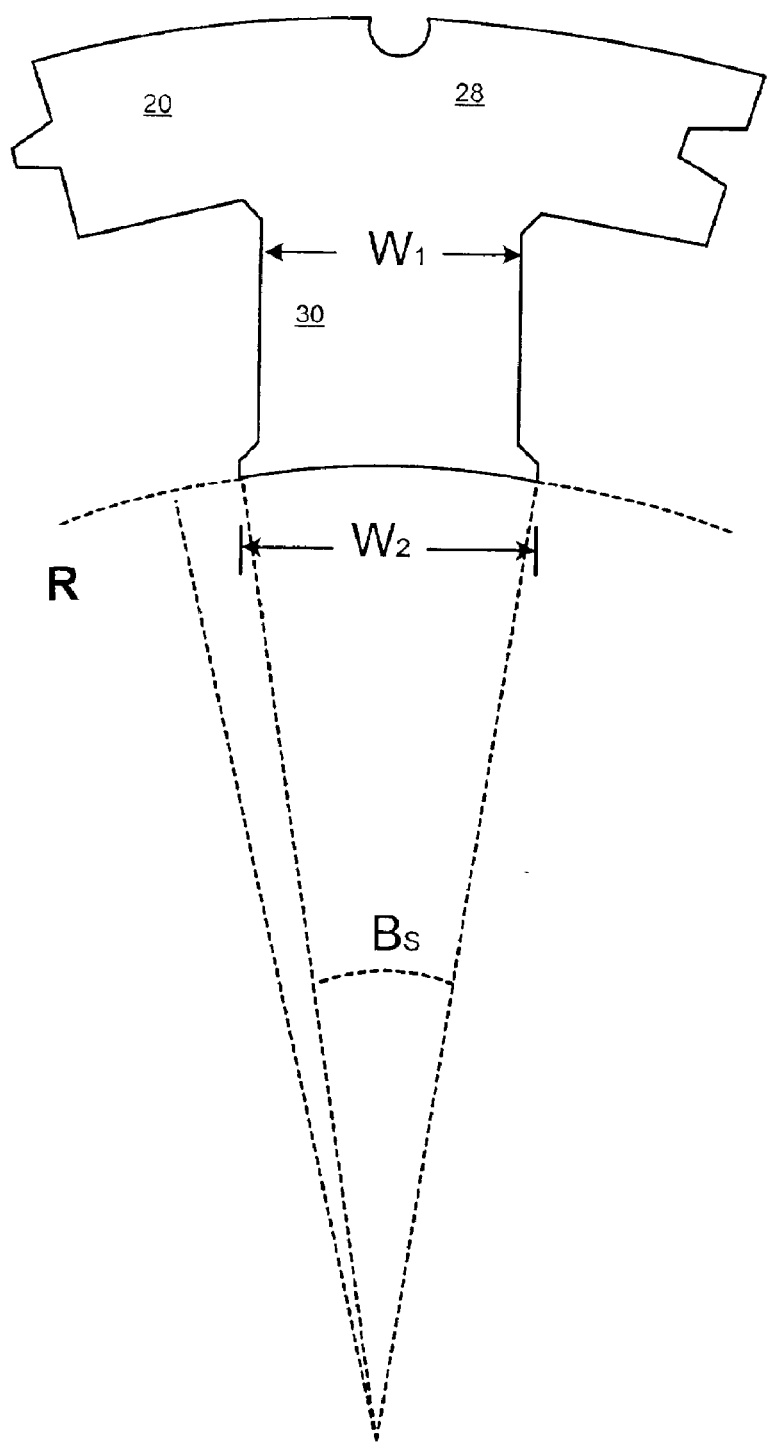
FIG. 7B identifies tooth width, projection width and stator pole arc on the stator plate of FIG. 7A.

Referring primarily to FIGS. 6, 7A and 7B, the stator segment core 120 includes a solid core or a stack of individual stator plates 126. Each stator plate 126 includes an outer rim section 128 and a tooth-shaped pole section 130. An outer edge surface 132 of the outer rim section 128 is shaped for mounting to an inner wall surface 134 of the housing 112. Each outer rim section 128 has a tongue projection 136 formed on one edge surface 138 and a groove 140 on its opposite edge surface 142. This tongue and groove arrangement helps align the stator segment assemblies during manufacturing. Because the stator segment assemblies are press fit or hot dropped into the housing, the tongue and groove arrangement can be omitted. Each pole section 130 of the stator plates 126 has an arcuate inner edge surface 144 and a pair of circumferentially-extending projections 146.

As previously mentioned, the stator segment core 120 is defined by a plurality of stator plates 126 that are stacked together. The stator plates 126 are die cut from thin sheets of magnetically conductive material. During the die cutting operation, a first pair of slits 150 are cut into the outer rim section 120 and a second pair of slits 152 are cut into the pole section 130 and central portions between the slits are deformed. The slits 150 are transverse in alignment relative to the slits 152. The stator plates 126 that form the stator segment core 120 are stacked and press fit. As can be seen in FIG. 7C, the central portions 153 of the stator plates 126 are deformed by the die punch operation. In the example in FIG. 7C, the central portion 153-1 and 153-2 are deformed. The central portion 153-1 of the stator plate 126-1 is deformed into and received between slits of the adjacent stator plate 126-2. As can be appreciated, additional stator plates include a deformed central portion 153 that is received by slits 150 or 152 of an adjacent stator plate 126. This operation results in the stator plates 126 being releasably interconnected to define the stator segment core 120.

The rotor 116 is shown to include a circular rim section 154 and a plurality of tooth-shaped pole sections 156 that project radially from the rim section 154. A circular bore 158 is formed in the rotor 116 and may include keyways 160. A rotor shaft (not shown) is received by the circular bore 158 of the rotor 116. In the particular embodiment shown, the rotor 116 has eight equally-spaced rotor pole sections 156 and the segmented stator 114 has twelve equally-spaced pole sections 130. Other rotor pole and stator pole combinations are also contemplated. In addition, each rotor pole section 156 has an arcuate outer edge surface 162 that defines an air gap 163 with respect to the arcuate inner edge surface 144 on the pole sections 130 of the stator segment core 120.

Referring to FIG. 7B, tooth width W1, projection width W2, and stator pole arc Bs are shown. As a result of segmenting the stator, the designer of the switched reluctance electric machine has greater flexibility in designing the dimensions of the stator segment assemblies. The slot opening dimension between radially inner ends of the stator teeth restricts the projection width W2 when needle and transfer winding methods are employed. This restriction is eliminated when the segmented stator assemblies are employed because the stator teeth can be wound individually before being assembled into the stator.

The tooth width W1 determines the magnetic flux density in the stator tooth and how much area is available for winding wire in the inter-polar stator slot. The designer of the switched reluctance electric machine can select the tooth width W1 so that it is sufficient to accommodate the maximum anticipated magnetic flux in the stator poles, but is not wider than necessary. By optimizing the tooth width W1, the slot area is increased, which allows additional winding wire. By increasing the current carrying capacity of the windings without causing overheating, the torque density of the switched reluctance electric machine can be improved. The design of the stator plates also depends on other factors such as the type of steel that is selected, the axial length of the stator stack, the operating speed, the overall size of the motor, and the desired magnetic flux density in the stator teeth.

Referring to FIG. 8, the stator segment assembly 118 is shown fully assembled to include the stator segment core 120, the end cap assembly 122 and the winding wire 124. The end cap assembly 122 is made from magnetically permeable material and includes a first end cap 164A, a second end cap 164B and a pair of elongated winding retainer sections 166A and 166B. The first end cap 164A is located at one end of the stator segment core 120 and the second end cap 164B is located at the opposite end of the stator segment core 120. The winding retainer sections 166A and 166B interconnect the first and second end caps 164A and 164B and are located adjacent to the projections 146 near the radially inner end of the pole sections 130 of the stator segment core 120. Preferably, the end caps 164A and 164B are similar in configuration. Likewise, it is preferable that the retainer sections 166A and 166B are similar in configuration. Snap-in connections are contemplated for connecting the opposite ends of each retainer section 166A and 166B to the end caps 164A and 164B. Additionally, it is contemplated that adhesives are used for bonding the end caps 164A and 164B to the opposite ends of the stator segment core 120 and the retainer sections to sides of the stator segment core 120. The end caps 164A and 164B and the retainer sections 166A and 166B can also be molded as an integral end cap assembly 122. Since the first end cap 164A is similar to the second end cap 164B, the following description of the components will use reference numerals with an "A" suffix for the first end cap 164A and the reference numerals for similar components of the second end cap 164B will be identical with a "B" suffix.

Terminals 170 and 172 are shown in FIGS. 8 and 10A to be mounted in slots 174 and 176 (FIG. 10C) formed in an end surface 178A of the first end cap 164A. One end of the winding wire 124 is connected to the first terminal 170 while an opposite end of the winding wire 124 is connected to the second terminal 172. Insulating material 177 is shown to be positioned to cover winding wire 124 on both lateral sides of stator core 120. The insulating material 177 is also positioned (but not shown) between the stator segment core 120 and the winding wire 124 as can be seen in FIG. 7A.

Referring to FIG. 9, the sensorless drive circuit 10 is shown connected via connecting wires 182, 184 and 186 to a printed circuit board 188. The printed circuit board 188 is circular and has a plurality of radially outwardly projecting terminal pads 190. Each terminal pad 190 has conductive terminal slots 192 and 194 arranged to accept installation of the terminals 170 and 172 for each stator segment assembly 118.

To more clearly illustrate the structure of the end cap assembly 122, FIG. 10A shows the stator segment assembly 118 prior to the winding wire 124 being wound thereon. The first end cap 164A includes an outer section 198A and an inner section 200A interconnected by a hub section 202A, all defining a common face surface 204A. The face surface 204A abuts and is bonded to an axial end surface 206 of the stator segment core 120. Similarly, the face surface 204B of second end cap 164B abuts and is bonded to an end surface 208 of the stator segment core 120. When the first end cap 164A is secured to the stator segment core 120, its outer section 198A extends slightly radially inward with respect to the outer rim section 128 and is parallel to the outer rim section 128. The hub section 202A is aligned with pole section 130 and the inner section 200A is aligned with and extends laterally beyond the inner edge surface 144 and the projections 146. A similar alignment is provided when the second end cap 164B is secured to the opposite end surface 208 of the stator segment core 120. Moreover, the width of hub sections 202A and 202B is less than or equal to the width of the pole sections 130 of the stator segment core 120. The opposite ends of the retainer sections 166A and 166B are connected to the face surfaces 204A and 204B of the end caps 164A and 164B, respectively, adjacent to their inner sections 200A and 200B. As such, the end cap assembly 122 defines a continuous annular channel within which the winding wire 124 can be precisely installed and maintained.

FIG. 10B shows the inner section 200A of the first end cap 164A and the inner section 200B of the second end cap 164B to be rectangular in shape. It is contemplated, however, that other configurations (i.e. semi-circular, square, tapered, etc.) could be used. As a further option, the retainer sections 166A and 166B could be provided as a cantilevered section that is integrally formed with the end caps 164A or 164B and adapted for connection to the inner section of the opposite end cap. To reduce the weight of the end cap assembly 122 or to make the molding process easier, lateral axial grooves 210 and a central axial groove 212 can be formed on the outer section of the end caps 164A and 164B. Likewise, a cavity 214 can also be formed to provide additional weight reduction or to make the molding process easier.

Referring now to FIGS. 11A, 11B and 11C, an alternative cap assembly 222 is shown for connection to the stator segment core 120 and supporting the winding wire 124. Reference numerals from FIGS. 10A, 10B and 10C will be used where appropriate to identify similar elements. Specifically, the first end cap 224A is generally similar to the first end cap 164A. The alternative end cap assembly 222 includes an additional pair of retainer sections. An outer retainer section 226A extends axially from the common face surface 204A adjacent to the outer section 198A for connection to the outer section 198B of the second end cap 224B. An outer retainer section 226B likewise extends axially from its common face surface 204B for connection to common face surface 204A of first end cap 224A. The outer retainer sections 226A and 226B provide additional support for the end cap assembly 122. The outer retainer sections 226A and 226B fill the arcuate inner edge 230 of the outer rim section 128. As a result, a substantially right angle projection to pole section 130 is formed. The outer retainer sections allow more precise control of the winding and minimizes damage that may be caused by a sharp edge defined by inner edge 230 and the edge surfaces 138 and 142. The outer retainer sections 226A and 226B have a tapered profile to mate with the profile of inner arcuate wall surfaces 230 (FIG. 7A) of the outer rim section 128.

As can be appreciated from the foregoing, the sensorless switched reluctance machine according to the invention has improved torque density due to the segmented stator and the precisely wound stator segment assemblies. The stator segment assemblies in the electric machine can be produced with a greater electrical uniformity and with lower variations in inductance and resistance. As a result, sensorless rotor position sensing techniques can be employed more effectively, which dramatically lowers the manufacturing costs and improves reliability and serviceability in the field. Because the manufacturing tolerances of the stator segments have been improved, less costly sensorless drive circuits can be employed and/or more accurate control can be achieved. In addition, the end cap assemblies according to the invention prevent winding creep and further help improve the electrical uniformity of the stator segment assemblies during use.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A switched reluctance electric machine comprising:
   a stator including a plurality of circumferentially-spaced stator segment assemblies that include a stator segment core and winding wire that is precisely wound around individual ones of said stator segment core to provide substantially uniform inductance and resistance characteristics, wherein said windings define a slot fill that is greater than 65%;
   a rotor defining a plurality of rotor poles, wherein said rotor tends to rotate relative to said stator to maximize the inductance of an energized winding; and
   a sensorless drive circuit that derives rotor position based on parameters that vary with at least one of said substantially uniform inductance and resistance characteristics of said stator segment assemblies and that energizes said winding wire around said stator segment assemblies to control operation of said switched reluctance machine based on said derived position of said rotor.

2. The switched reluctance electric machine of claim 1 wherein said sensorless drive circuit includes an inductance sensor that senses inductance of said winding wire of one of said stator segment assemblies wherein said sensorless drive circuit derives said rotor position from said sensed inductance.

3. The switched reluctance electric machine of claim 1 wherein said sensorless drive circuit includes a diagnostic pulse generator that generates a diagnostic pulse that is output to said winding wire of one of said stator segment assemblies, wherein said sensorless drive circuit derives said rotor position based on a sensed change in phase current due to said diagnostic pulse.

4. The switched reluctance electric machine of claim 1 wherein said sensorless drive circuit determines rotor position by monitoring a slope of a current waveform related to current flowing in said energized winding and by identifying when said slope is zero.

5. The switched reluctance electric machine of claim 1 wherein said sensorless drive circuit monitors current and flux and employs a look up table to determine said derived position of said rotor.

6. The switched reluctance electric machine of claim 1 wherein said stator segment core includes stator plates with an outer rim section and a tooth section that extends radially inwardly from a center portion of said outer rim section.

7. The switched reluctance electric machine of claim 6 further comprising:
   an insulation layer located between said winding wire and said stator segment core.

8. The switched reluctance electric machine of claim 1 further comprising:
   projections extending from opposite sides of a radially inner end of said tooth section.

9. The switched reluctance electric machine of claim 8 further comprising:
   first and second end caps connected to opposite axial ends of said stator segment core; and
   first and second end cap retainer sections that extend adjacent to said projections and that connect said first and second end caps,
   wherein said first and second end caps and said first and second end cap retainer sections define an annular retention channel that reduces movement of said winding wire during use and wherein said first and second end caps and said first and second end cap retainer sections are not located between said winding wire and axial side surfaces of said tooth section.

10. The switched reluctance electric machine of claim 6 wherein said stator plates of said stator segment core include radial and lateral slits and first and second central portions that are deformed to hold said stack of stator plates together.

11. A sensorless switched reluctance electric machine comprising:
   a stator;
   a rotor;
   a machine housing;
   a plurality of circumferentially-spaced stator segment assemblies that are arranged around an inner surface of said machine housing;

said stator segment assemblies defining a salient stator pole that extends in a radially inward direction;

said stator segment assemblies including a stator segment core and winding wire that is precisely wound around individual ones of said stator segment core to provide substantially uniform inductance and resistance characteristics, wherein said windings define a slot fill that is greater than 65%; and a sensorless drive circuit that is connected to said winding wire, that derives rotor position based on parameters that vary with at least one of said substantially uniform inductance and resistance characteristics of said stator segment assemblies and that energizes said winding wire around said stator segment assemblies to control operation of said switched reluctance machine based on said derived position of said rotor.

12. The sensorless switched reluctance electric machine of claim 11 wherein said sensorless drive circuit includes an inductance sensor that senses inductance of one of said stator segment assemblies, wherein said sensorless drive circuit derives said rotor position based on said sensed inductance.

13. The sensorless switched reluctance electric machine of claim 11 wherein said sensorless drive circuit includes a diagnostic pulse generator that generates diagnostic pulses that are output to one of said stator segment assemblies, wherein said sensorless drive circuit senses changes in phase current resulting from said diagnostic pulses and derives said rotor position therefrom.

14. The switched reluctance electric machine of claim 11 wherein said sensorless drive circuit determines rotor position by monitoring a shape of a current waveform related to current flowing in said energized winding and by identifying when said slope is zero.

15. The switched reluctance electric machine of claim 11 wherein said sensorless drive circuit monitors current and flux and employs a look up table to determine said derived position of said rotor.

16. The sensorless switched reluctance electric machine of claim 11 wherein said stator segment core includes stator plates with a radially outer rim section and a tooth section that extends radially inwardly from said radially outer rim section.

17. The sensorless switched reluctance electric machine of claim 16 further comprising:

an insulation layer located between said winding wire and said stator segment core.

18. The sensorless switched reluctance electric machine of claim 16 further comprising:

projections extending from opposite sides of a radially inner end of said tooth section.

19. The sensorless switched reluctance electric machine of claim 18 further comprising:

first and second end caps connected to opposite axial ends of said stator segment core; and first and second end cap retainer sections that extend adjacent to said projections and that connect inner ends of said first and second end caps, wherein said first and second end caps and said first and second axial end cap retainer sections define an annular retention channel that reduces movement of said winding wire during use and wherein said first and second end caps and said first and second end cap retainer sections are not located between said winding wire and axial side surfaces of said tooth section.

20. The sensorless switched reluctance electric machine of claim 16 wherein said stator plates of said stator segment core include radial and lateral slits and first and second central portions that are deformed to hold said stator segment core together.

21. A sensorless switched reluctance electric machine comprising:

a machine housing;

a rotor that rotates relative to said machine housing;

a stator that is mounted on an inner surface of said machine housing, said stator including a plurality of circumferentially-spaced stator segment assemblies, wherein said stator segment assemblies include a stack of stator plates forming a stator segment core and winding wire that is precisely wound around individual ones of said stator segment core to provide substantially uniform inductance and resistance characteristics, wherein said windings define a slot fill that is greater than 65%, and wherein each of said stator plates has a generally "T"-shaped cross-section, a radially outer rim section, and a tooth section that extends radially inwardly from a center portion of said radially outer rim section; and a sensorless drive circuit that derives rotor position based on parameters that vary with at least one of said substantially uniform inductance and resistance characteristics of said stator segment assemblies and that energizes said winding wire around said stator segment assemblies to control operation of said switched reluctance machine based on said derived rotor position.

22. The sensorless switched reluctance electric machine of claim 21 further comprising:

an insulation layer located between said winding wire and said stator segment cores.

23. The sensorless switched reluctance electric machine of claim 21 further comprising:

projections extending from opposite sides of a radially inner end of said tooth section.

24. The sensorless switched reluctance electric machine of claim 23 further comprising:

first and second end caps connected to opposite axial ends of said stator segment core; and first and second end cap retainer sections that extend adjacent to said projections and that connect inner ends of said first and second end caps, wherein said first and second end caps and said first and second end cap retainer sections define an annular retention channel that reduces movement of said winding wire during use and wherein said first and second end caps and said first and second end cap retainer sections are not located between said winding wire and axial side surfaces of said tooth section.

25. The sensorless switched reluctance electric machine of claim 21 wherein said stator plates of said stator segment core include radial and lateral slits and first and second central portions that are deformed to hold said stator segment core together.

26. The sensorless switched reluctance electric machine of claim 21 wherein said sensorless drive circuit includes an inductance sensor that senses inductance of one of said stator segment assemblies.

27. The sensorless switched reluctance electric machine of claim 21 wherein said sensorless drive circuit includes a diagnostic pulse generator that generates diagnostic pulses that are output to one of said stator segment assemblies.

* * * * *